J. D. JONES.
DUST GUARD.
APPLICATION FILED APR. 15, 1916.
1,209,971.
Patented Dec. 26, 1916.
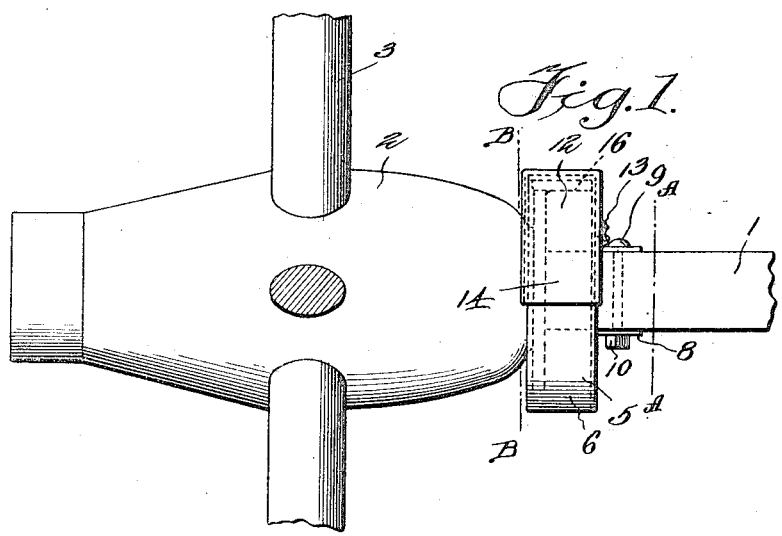
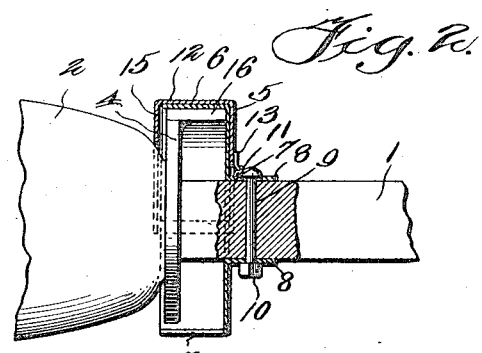
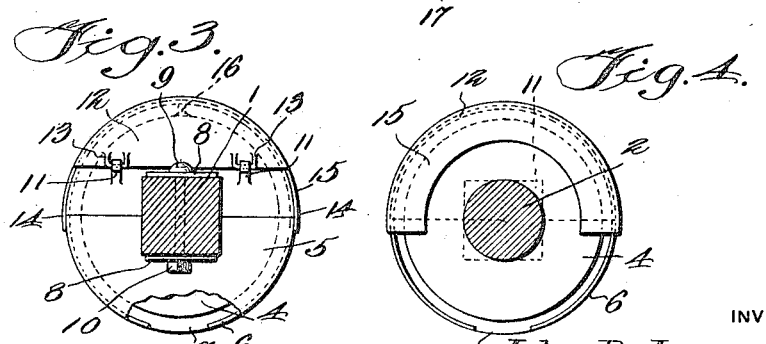
WITNESSES
INVENTOR
John D. Jones,
BY
ATTORNEY

UNITED STATES PATENT OFFICE.

JOHN D. JONES, OF SPARTA, WISCONSIN.

DUST-GUARD.

1,209,971.  Specification of Letters Patent.  Patented Dec. 26, 1916.

Application filed April 15, 1916.  Serial No. 91,388.

*To all whom it may concern:*

Be it known that I, JOHN D. JONES, a subject of the King of Great Britain, residing at Sparta, in the county of Monroe and State of Wisconsin, have invented certain new and useful Improvements in Dust-Guards, of which the following is a specification.

This invention relates to dust guards for vehicles to cover the joint between the hub and axle.

The principal object of this invention is to provide a device which will effectively prevent dust from entering the joint between the hub and axle, and which may be easily removed from the vehicle.

Another object of this invention is to provide a device from which the excess and accumulated grease from the hub may be removed.

With these and other objects in view this invention consists in the construction, combination and arrangement of parts as will be hereinafter described and claimed.

Reference is to be had to the accompanying drawings forming part of this specification, in which similar reference characters indicate corresponding parts throughout the several views, and in which, Figure 1 is a view of one end of an axle and hub with the invention applied, Fig. 2 is a fragmentary view of an axle and hub showing the invention in section, Fig. 3 is a section on the line A—A of Fig. 1 and, Fig. 4 is a section on the line B—B of Fig. 1.

Referring more particularly to the drawings, the numeral 1 designates an axle carrying the usual hub 2 in which are inserted the spokes 3. A flange or collar 4 is integrally formed on the inner end of the hub, or, if desired, the two may be made in separate parts and fastened together by any suitable means.

The protector, which covers the joint between the axle and hub 2, comprises a cupped-shaped member 5, the turned edge of which overlies the collar 4, thus reducing to a minimum the possibility of dust and dirt entering the hub. An opening 7 conforming to the configuration of the axle, is formed in the face of the cup 5 by striking therefrom the arms 8 which lie against the axle. A bolt 9, which is secured in position by a nut 10, and which passes through registering openings in the arms and axle, holds the cup in position. A plurality of fingers 11 are struck from the upper portion of the cup and their terminals curved to form eyes.

A semi-circular cover 12, which is substantially U-shaped in cross-section, is hingedly connected to the cup 5 by means of loops 13 passing through the eyes formed by the fingers 11. The edge 14 of the cover extends slightly below the longitudinal axis of the axle and embraces the cup 5, while the side 15 extends downwardly and engages the collar 4, which will retain the cup in position should the bolt 9 becomes accidentally incapacitated for use or lost during transit.

Very often too much grease is applied to an axle and when a dust cup of the type in general use today is employed, the grease will accumulate and cause the inconveniences so prominent when no cup is used. In this invention, however, such a detriment to the life of the axle or hub cannot occur as means are provided which eject the accumulated grease. A scraper 16 is secured to the collar 4 by bolts or rivets, or it may be cast integrally therewith, and engages with the interior wall of the cup 5. As the cup is made fast to the axle and the collar and scraper are secured to the hub, which rotates on the axle, any grease which may have entered the cup will be removed by the scraper through an opening 17 in the lower portion of the cup. The hub may be very easily removed from the axle by simply lifting the hinged cover so that the face 15 disengages the collar 4, and after the axle nut is removed, the hub may be taken from the axle. If access to the joint, which is protected by the cup, or to the cup itself, is desired, all that is necessary is to remove the bolt 9, remove the cover 12 from the collar, and slide the device along the axle. It is understood, of course, that the application of the device is as simple and easy as its removal.

Various changes in the form, proportion and details of construction may be resorted to without departing from the principle or sacrificing any of the advantages of this invention as claimed.

Having fully described my invention what I desire to secure by Letters Patent is:

1. The combination with an axle and a hub having a collar thereon, of a dust band comprising a cupped shaped member having laterally extending arms engaging the axle, means for securing the arms to the axle, and a hinged cover engaging the collar.

2. The combination with an axle and a hub having a collar thereon, of a dust band secured to the axle and overlying the collar, said band comprising a cupped shaped member having an opening in its lower extremity, and a cover hingedly connected to said member.

3. The combination with an axle and a hub having a collar thereon, and scraping means attached to the collar, of a dust band comprising a cup secured to the axle, and engaging with the scraping means, and a hinged cover secured to the cup and engaging with the collar.

4. The combination with an axle and a hub having a collar thereon and a laterally extending arm secured to the collar, of a dust band having an opening in the lower portion thereof secured to the axle and engaging with the arm whereby the band is cleaned of accumulated matter.

In testimony whereof I affix my signature in presence of two witnesses:

JOHN D. JONES.

Witnesses:
  H. W. BALCH,
  D. L. JONES.

Copies of this patent may be obtained for five cents each, by addressing the "Commissioner of Patents, Washington, D. C."